(12) United States Patent
Hembree

(10) Patent No.: US 6,213,436 B1
(45) Date of Patent: Apr. 10, 2001

(54) LEVELING PLATFORM

(75) Inventor: Wayne A. Hembree, Bowie, MD (US)

(73) Assignee: Hembree Enterprises, Inc., Bowie, MD (US)

(*) Notice: Subject to any disclaimer, the term of this patent is extended or adjusted under 35 U.S.C. 154(b) by 0 days.

(21) Appl. No.: 09/128,672

(22) Filed: Aug. 4, 1998

Related U.S. Application Data

(60) Provisional application No. 60/055,062, filed on Aug. 8, 1997.

(51) Int. Cl.[7] .................................................. F16M 11/38
(52) U.S. Cl. ........................ 248/167; 248/439; 248/188.2
(58) Field of Search ........................... 248/167, 188.1, 248/188.2, 188.6, 434, 436, 439, 176.1, 150; 108/116, 129, 147.19, 147.11

(56) References Cited

U.S. PATENT DOCUMENTS

| | | | |
|---|---|---|---|
| 118,480 | * 8/1871 | Parker | 248/167 X |
| 561,857 | * 6/1896 | Baxter | 248/439 |
| 889,494 | * 6/1908 | Van Halder | 248/439 X |
| 1,238,142 | * 8/1917 | Hitchcock | 248/167 |
| 1,357,041 | * 10/1920 | Fritch | 248/167 X |
| 1,514,313 | * 11/1924 | Davenport | 248/167 |
| 1,777,759 | * 10/1930 | Melvin | 248/167 X |
| 2,881,996 | * 4/1959 | Matchette, Jr. | 248/434 X |
| 2,913,207 | * 11/1959 | Eash | 248/188.2 X |
| 3,837,328 | * 9/1974 | Schaffer | 248/439 X |
| 4,109,567 | * 8/1978 | Gage et al. | 248/188.2 X |
| 4,998,697 | * 3/1991 | Esposito | 248/188.1 X |
| 5,331,764 | * 7/1994 | Sun | 248/436 X |

* cited by examiner

*Primary Examiner*—Leslie A. Braun
*Assistant Examiner*—Gwendolyn Baxter
(74) *Attorney, Agent, or Firm*—Miles & Stockbridge P.C.; Edward J. Kondracki

(57) ABSTRACT

A lightweight, collapsible compact platform for use by hikers and backpackers includes a supporting surface having horizontal adjustability. The platform can be conveniently folded into a compact carrying unit less than 6 ounces in weight and having a fold down or compactability ratio of at least approximately 25 to 1. The supporting surface cooperates with vertical legs that can be adjusted to provide a level supporting surface irrespective of the slope of the underlying ground surface.

20 Claims, 9 Drawing Sheets

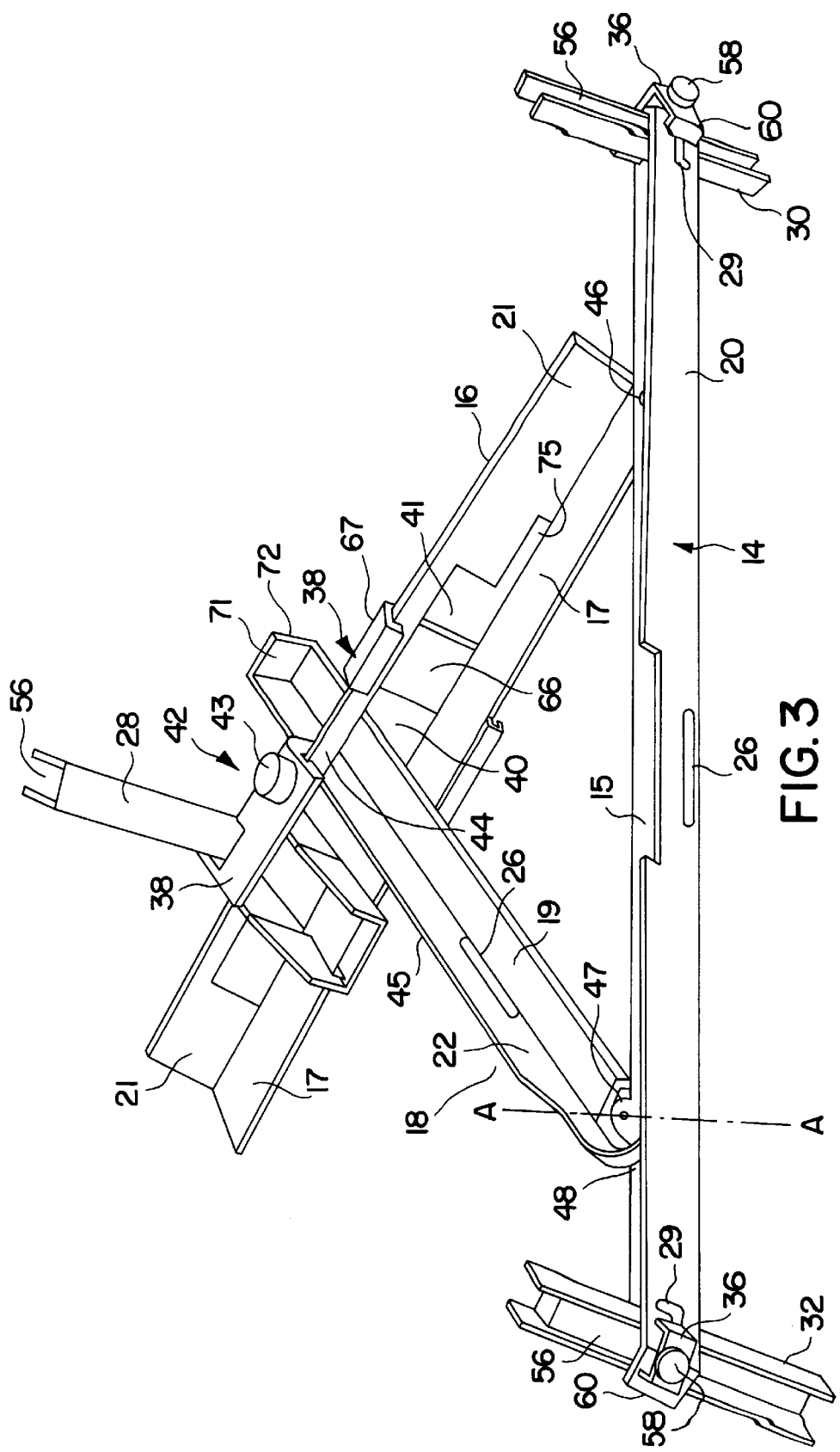

LEVELING PLATFORM

This application claims benefit of Provisional Application Ser. No. 60/055,062 filed Aug. 8, 1997.

BACKGROUND OF THE INVENTION

1. Field of the Invention

The present invention relates to leveling platforms and more particularly to a backpacking table adapted to provide a stable and level or horizontal surface irrespective of the slope of the underlying ground surface.

2. Description of Related Art

Backpacking places various demands and constraints on equipment utilized because there is a limit as to what can be carried by an individual. Compactness and weight are two of the more important constraints. Thus, backpacking equipment is generally required to be lightweight and of a size that can be conveniently accommodated in a backpack.

Because the terrain to which backpackers are attracted is seldom level, there is a need to provide a stable and level platform for accommodating various needs. Such might be accomplished by a flat substrate with legs which are readily adjustable to provide a substantially horizontal or level supporting surface irrespective of the slope of the underlying ground surface. Such a surface could be utilized for a variety of purposes, e.g. cooking, eating, and effecting equipment repairs, but would not necessarily address the problem of size and weight.

Backpacking stoves are sometimes provided with adjustable legs which provide a small degree of leveling adjustment, but such legs do little for stability, particularly with respect to steep sloping surfaces. There are also products that improve the stability of some stoves, but do not provide a leveling capability.

SUMMARY OF THE INVENTION

The subject invention overcomes the aforenoted deficiencies and provides a platform having a good leveling capability, coupled with increased stability, a supporting surface having a horizontal adjustability to fit many stoves and most important is small in size and light in weight and which can be conveniently folded into a compact carrying unit.

It is a primary object of the present invention to provide a platform which can be adjusted to provide a level supporting surface irrespective of the slope of the underlying ground surface.

Another object of the present invention is to provide a lightweight and compact table readily adapted for use by backpackers.

A further object of the present invention is to provide a lightweight compact collapsible table having a high ratio of compactability.

These objects and their attendant advantages are accomplished by the present invention by a three member adjustable-size triangular body and an integral slide, with independently vertically adjustable leg members adapted to be folded into the members to provide a compact unit less than 6 ounces in weight and adapted to be carried in a backpack.

In accordance with one feature of the invention there is provided a leveling platform having a fold down or compactability ratio of at least approximately 25 to 1. Compactability ratio is defined as the volume occupied by the platform within its maximum external dimensions when in use compared to the volume of the platform in its fold down or knock down condition ready for transport.

In accordance with yet another feature of the present invention a leveling platform comprises a three-member adjustable-size triangular body and an integral slide on one member, and three independently vertically adjustable legs extending from the corners of the triangular body adapted to set the height and level of the platform over various slopes and contours of the underlying ground surface.

In still another feature of the invention, the three legs fold into the body members to provide a compact unit which takes up only about 8% of the volume of the full body with legs extended.

In accordance with the present invention, the members of the triangular body include:

1. a front fixed member;
2. a left pivoting arm member; and
3. a right pivoting arm member.

The right arm member includes a slot that allows the left arm member to project through it. By rotating the arms and moving the left arm through the right arm, various size triangular shapes of the body can be obtained.

Each member is a right angle strut of lightweight metal, such as aluminum, having a flat surface and a vertical wall surface. Objects to be supported rest within the vertical surfaces of the triangular body formed by the three members. By changing the body size and triangular shape various objects of varying sizes can be supported and contained. To fold the members into a compact unit, the left arm member is slid all the way through a slot in a slide on the right arm member, thus bringing the front and right member into an abutting position. The left arm member is then pivoted into position adjacent the abutting members to active a nested or fold down state of the members. In the nested state, the open area within the walls of the three members is collapsed. The right arm member slides under the front member and when the left member is pivoted into its folded position. The vertical walls of the members form two channels into which the leg members are pivotally received.

A slide is disposed over a slot in the right arm and includes a slot complimentary to a slot in the right arm. The left arm protrudes through the slots and a lock mechanism, such as, for example a bolt is used to lock the left arm and the right arm together and to lock the selected triangular shape.

Two adjustable-length legs are slidably contained within two holes at opposite ends of the front member and a third leg is slidably contained in one hole in the slide. The legs are C-shaped with a front slit forming a channel. A threaded nut slides within the channel of each leg and a bolt extends through a hole in an end-tab located at an end of the associated member and is threaded into the nut within the leg. When the screw is tightened the leg is held against the associated member. When the screw is loosened the leg can be slipped through the hole and its height composition relative to the platform can be adjusted. At the desired height, the bolt is again tightened to maintain the desired length. Each leg is independently adjustable to a desired height.

As shown in FIGS. 5A, 5B and 8, the end-tabs 61, 62, and 71 are disposed on either end of the front member 14 and on a slide 38 arranged to operatively slide along the right member 16. FIG. 5B shows end-tab 61, 62 oriented perpendicular to the long length of the associated member 14 and has a hole for receiving the bolt. FIG. 5A shows an alternative embodiment in which end-tab 61, 62 is oriented at an angle with respect to the long length of the associated member 14 so that a leg held by a bolt against the end-tab will lean at an angle relative to the body. In this way, the adjustable legs are mounted in the triangular body at slight outward angles to assume an even greater support area, thereby providing increased stability.

Stability of the object supported on the body is improved by having the legs located further out from the object than the object's own supporting mechanism. Additionally, the adjustable legs can be mounted in the triangular body at slight outward angles to assume a greater support area and thereby increased stability.

A leg is located in each member and can be rotated at 45° to the perpendicular walls at the ends of the each member and the slide. In this position, the front slit or channel of the leg faces the corner. When the bolt is tightened through the intersection of the perpendicular walls it forces the leg to be supported at its two edges on opposite sides of the slit by the entire height of the two adjacent perpendicular walls. A separate channel piece is included and adapted to press against the outside surfaces of the perpendicular walls through which the bolt projects. The separate channel piece adds additional strength to the walls when the bolt is tightened and provides an operational advantage in folding the leg into its fold position.

Two of the legs fold into the front fixed member, one above the other, and the third leg folds into the right arm. A slot extends from each bolt containing hole at the intersection of the perpendicular walls to allow for a 45° rotation of a leg. When the bolt is loosened sufficiently, the leg can be pulled up through the hole in the member and the channel and locking bolt can be rotated into the slot. The leg can then be rotated to lie within one of the channels formed by three members. The leg can be returned to service by reversing this procedure. The channel piece keeps the bolt in place until the bolt is loosened sufficiently to rotate the leg at which point the channel also will slide to the front surface of one of the perpendicular wall members and be locked in place.

BRIEF DESCRIPTION OF THE DRAWINGS

These and other objects and features and their attendant advantages will become more readily apparent to those skilled in the art from the following detailed description of the invention when considered in conjunction with the accompanying drawings. All dimensions shown are in inches. Referring to the drawings:

FIG. 3 is a fragmentary perspective view of the three member adjustable size triangular body which forms the platform of FIG. 1 for supporting objects such as the camping stove shown in FIG. 1 and illustrates in particular the cooperation of the right arm member, the slide and the left arm member which passes through slots in the slide and right arm member.

FIG. 4B to a perspective view of on alternate embodiment of the front fixed member.

FIGS. 5-1, 5-2 and 5-3 show details of punchouts shown in FIG. 5B.

DESCRIPTION OF THE PREFERRED EMBODIMENTS

Figure 1:
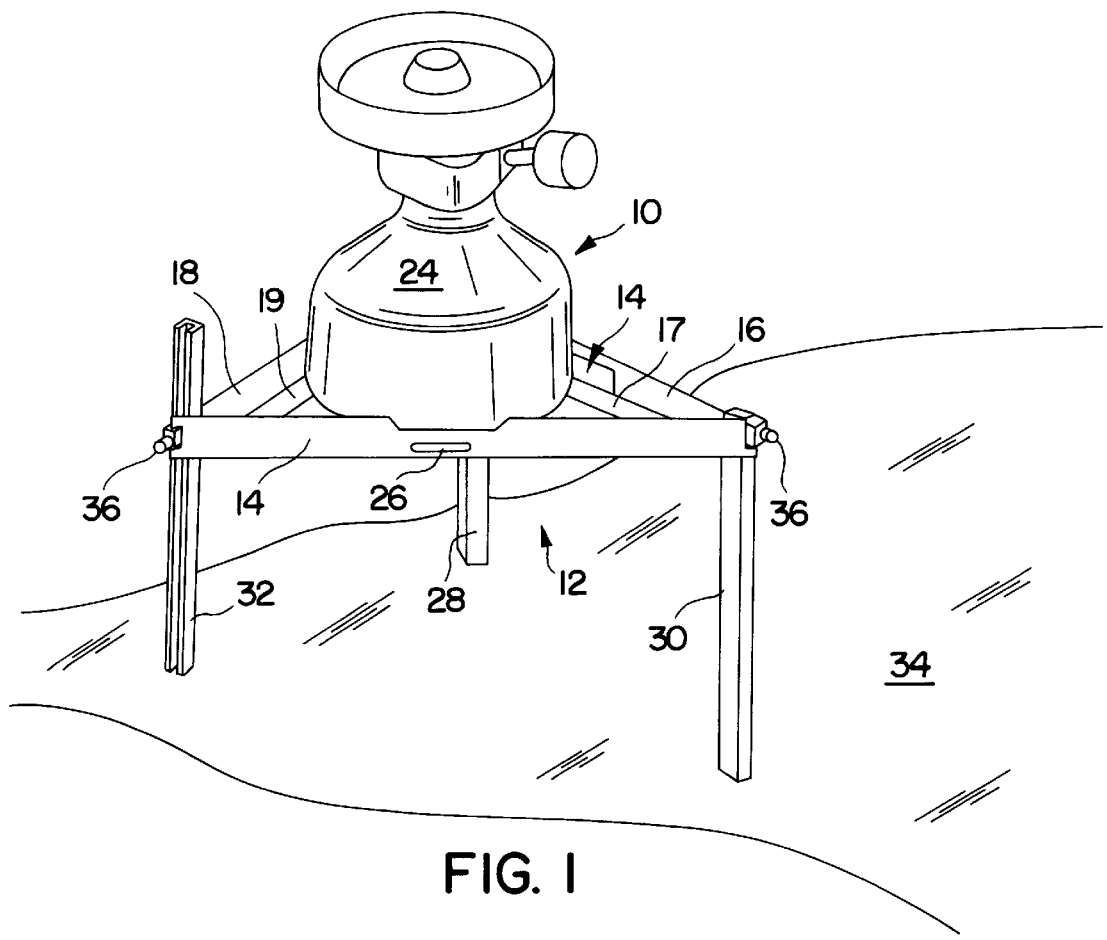
FIG. 1 is a perspective view of the inventive leveling platform mounted on a sloping ground surface with the legs adjusted to provide a level camping stove supporting table.
Figure 2:
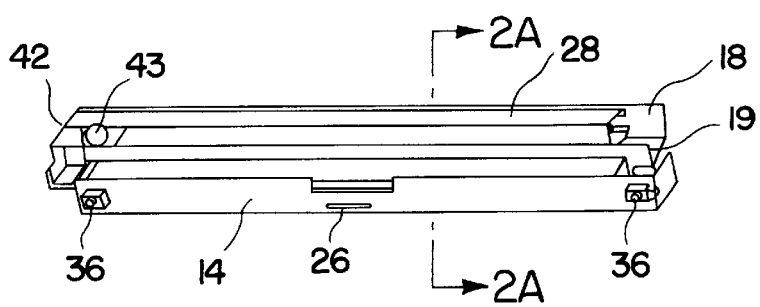
FIG. 2 is a view of the invention in its folded condition.
Figure 5A:
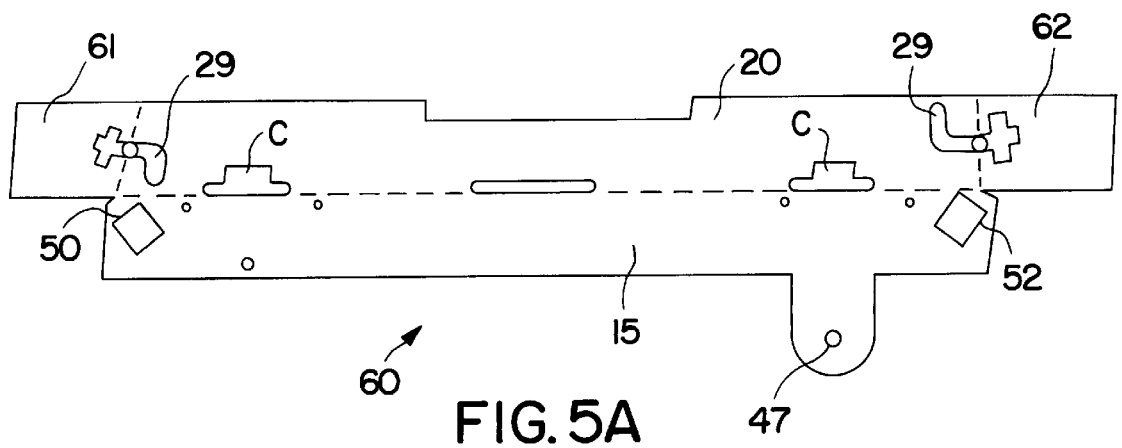
FIG. 5A shows an engineering blank of the front fixed member shown in FIG. 4A with physical dimensions of various parts.
Figure 5B:
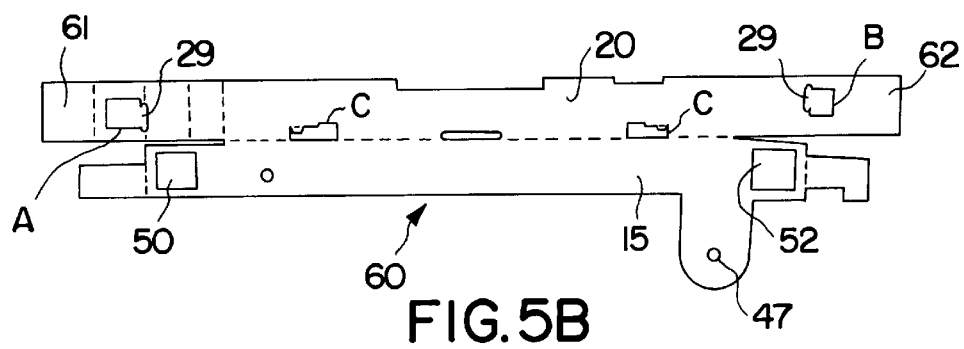
FIG. 5B shows an alternate embodiment of an engineering blank of the alternate construction of the front fixed member shown in FIG. 4B.
Figures 1, 5:
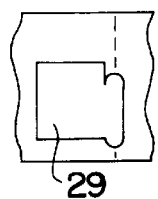
Figures 2, 5:
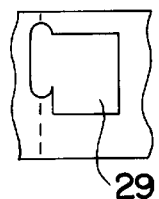
Figures 3, 5:
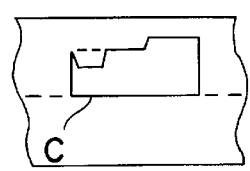

Referring to the drawings, and in particular to FIGS. 1–3, the invention as illustrated comprises a leveling platform 10 including a three member adjustable size triangular body 12 made up of a front member 14, a right arm member 16 and a left arm member 18. Each member 14, 16, and 18 has an internal horizontal flat support surface, 15, 17 and 19 respectively, and an upward extending right angle wall surface 20, 21 and 22, the inner surface of which helps to contain an object such as stove 24 which rests on the flat supporting surfaces 15, 17 and 19. Stove 24 typically has projections at its lower end which are adapted to be received in slots 26 providing each of the members 14 and 16.

The three members 14, 16, and 18, when fully extended form a triangular body having a central opening 4. Camping stove 24, which may have a rounded portion extending within the opening, but generally supported on the flat surfaces 15, 17 and 19, or their edges, may be further stabilized by extensions (not shown) at the base of the stove adapted to project into slots 26. If desired, where the object to be supported has a flat base, a flat piece, either solid or mesh, preferably corresponding to the shape of the triangular body may be positioned to rest on the flat surfaces 15, 17 and 19 within the adjacent vertical walls to thereby provide a flat table.

To maintain the triangular body level, three adjustable legs 28, 30 and 32 are contained at the corners of the triangular body when the members are fully extended. The legs are vertically adjustable relative to the body 12 according to the slope and contour of the ground surface 34. As shown in FIG. 1, the ground slopes from left to right. Thus, leg 32 is locked into the left hand corner of the triangular platform slightly above its mid-point. The ground surface 34 under the right hand corner of the triangular platform as viewed in the drawing is somewhat lower. Thus, the vertical leg 30 extends it full distance and is locked into the corner of the triangular platform formed by members 14 and 16. Similarly, leg 28 is adjusted for the contour and slope of the ground surface beneath the back corner of the platform 10. Advantageously, a locking mechanism 36 is provided at opposite ends of the front fixed member 14, and on slide 38 disposed on right arm member 16, as more clearly shown in FIG. 3.

At this point, it should be noted that the leveling platform is extremely compact in size having height of approximately 8". The front arm member extends a distance between the legs 30 and 32 of approximately 9". The overall length of right arm member 16 is approximately 10" due to accommodate slide 38 at the end of the arm. Advantageously, the triangular base member is made of a lightweight metal, typically aluminum or the like and weighs less than 6 ounces. As shown in FIG. 2, the unit is adapted to be folded down into a compact package having a length of approximately 10", a width of 2¼" and a height of 1¼", which takes the form of an elongate member. In its folded condition, as shown in FIG. 2, the overall volume of the platform of less than 30 cubic inches, and is fully extended position, or in use position, occupies a volume of approximately 720 cubic inches. Thus, the folding capability of the table gives it a fold down or compactible ratio of approximately 25 to 1, making it extremely desirable for use by backpackers and campers in areas were weight and volume of equipment carried is at a premium. It can be readily appreciated that the platform in its folded condition as shown in FIG. 2 takes up very little space and can be readily and conveniently stored in a backpack.

FIG. 3 illustrates the triangular platform 10 in greater detail. To this end, slide 38 is affixed to arm 16 and includes a slot 40 complementary to slot 41 provided in arm 16. Left arm member 18 passes through the slots 40, 41 and when member 16 is extended to provide the desired size opening between the triangular members, the left and right arms are locked together by lock mechanism 42. Turning of bolt 43 causes the slide 38 to press on the vertical wall 21 of member 16, which forces edge 44 of the upper rim of slot 41 to press and frictionally engage the upper edge 45 of the vertical wall 22 of arm member 18. Arm member 18 is pivoted at its lower end at 47 to an extension 48 extending from flat support surface 15 of member 14. The extension is necessary so that when arm 16 is pivoted against the front member 14, slot 41 on arm member 16 and the vertical wall 22 passes the vertical axis of pivot 47 to form a channel 23 between walls 20 and 21, while the lower surface of 17 of member 16 folds in below the lower surface 15 of member 14. The arms overlay each other with channel being formed between walls 20 and 21 to allow arm 18 to pivot inward adjacent the wall 21 to form a second channel 25 between walls 20 and 21, as best shown in FIGS. 2 and 2A.

The final fold down or collapsed position of the platform 10 is effected by rotating each of the legs into associated channels 23 and 25. To this end, the adjustable length legs 30 and 32 are contained within two rectangular holes 50 and 52, respectively in front member 14. Holes 50 and 52 have axes oblique from the major longitudinal and vertical longitudinal axis of member 14 at angle of 45°. A similar rectangular hole 54 with a 45° oblique axis is provided in slide 38. Each leg is a channel having a C-shaped cross-section, the channel having a front slit 56 formed so as to enable a threaded nut 57 to be captively retained to slide within the leg channel. A bolt 58 passes through the slit 56 and through a c-shaped channel member 60 and is threaded into the captive nut 57. The arms of the channel member 60 are adapted to engage on opposite sides of the perpendicular corners of the fixed member 14 and perpendicular corner of slide 38 to lock a leg in place upon tightening of bolt 58. When bolt 58 is tight, the corresponding leg is held fast against body. When the bolt is loose, the leg can slip through the associated hole (50, 52, 54) and can be adjusted to a desired height at which point the bolt is tightened to maintain the height and set the level of the platform.

As shown in FIG. 3, legs 30 and 32 are positioned outside the pivot points 47 and 46 and on the outer extremity of front arm 14, while leg 28 is outside of slots 40, 41 to provide maximum stability for the table.

Figure 2A:
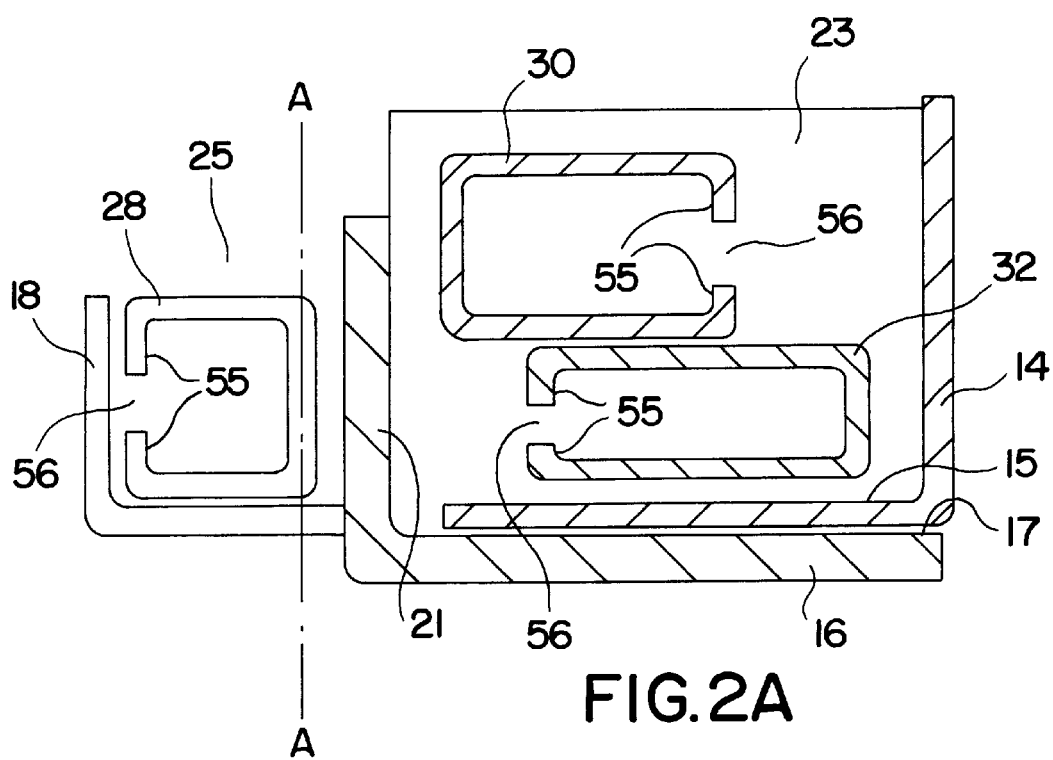
FIG. 2A is a cross-sectional view along lines 2A—2A of FIG. 2.
Figure 4A:
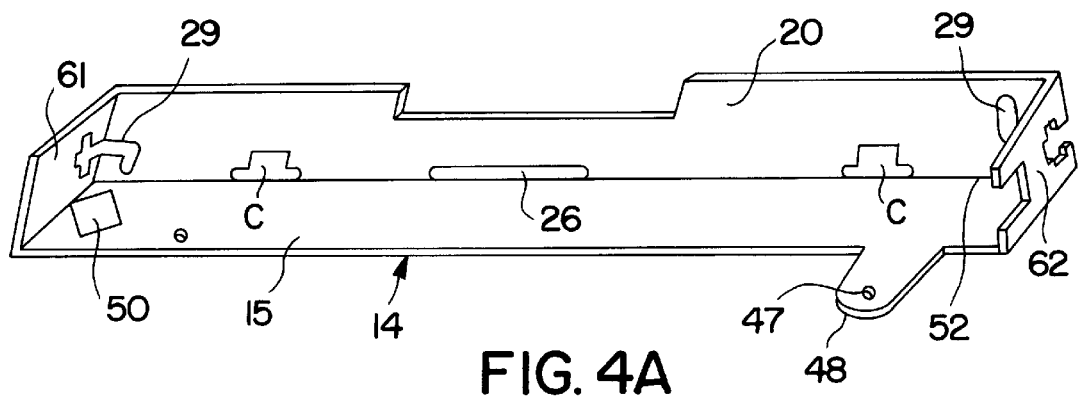
FIG. 4A is a perspective view of the front fixed member shown in FIG. 1 to which the left and right arm members are pivoted.

As herein before noted, and as shown in FIG. 2A, legs 30, 32 fold into the fixed member 14, one above the other, and the third leg 28 folds into the left arm member 18. To effect this fold, it is necessary to allow the legs to turn 45° from their platform supporting position. To this end, member 14 is provided with a shaped slot 29 at each end to receive lock bolt 58. The slot 29 is continued a short distance away from the corner of the wall as shown in FIG. 4A. A similar slot arrangement is provided in a slide 38. In this manner when the screw is loosened sufficiently, the leg can be pulled up through the associated hole and rotated 45°. Thereafter, it can be pivoted about its lock nut and bolt to a horizontal position in the channels 23 and 25. By reversing the procedure, the leg can be returned to its table/platform supporting position.

Figure 4B:
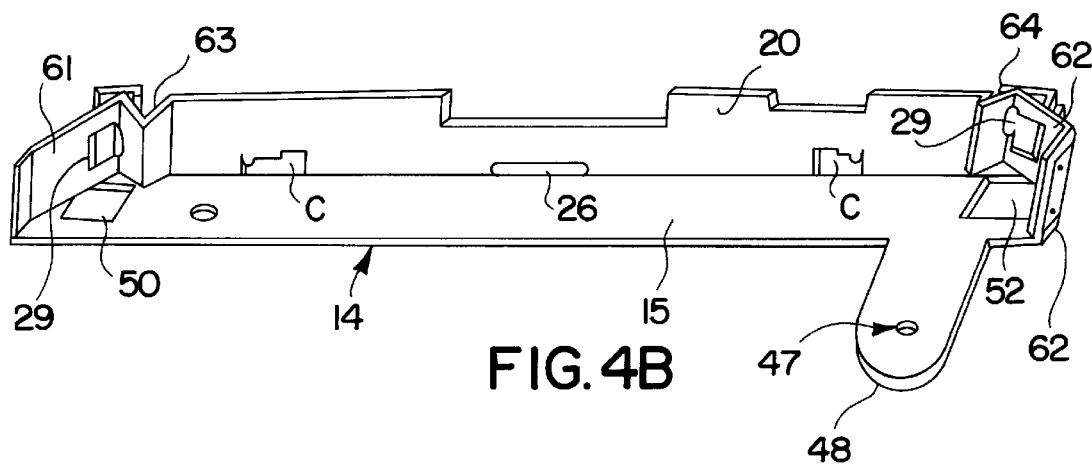

FIGS. 4A through 14 illustrate the manufacturing details of the various members. Referring to FIGS. 4A and 5A, there is illustrated a blank 60 from which front member 14 is formed. Blank 60 includes a flat central member cut to provide tabs 61 and 62 at opposed ends which may be folded up to form the outer sides of member 14. As shown in FIG. 5A, tabs 61, 62 are folded at an angle relative to horizontal support surface 15. Advantageously, legs 30, 32 when raised into position against respective tabs 61, 62, assume a posture wherein the leg ends touching the ground are disposed outwardly from the overall dimensions of the triangular base, thereby providing a added stability. Wall 20 is likewise folded upward to form an inside vertical wall supporting surface for the object to be carried. Prior to folding the tabs 61 and 62 and side 20, the blank 60 is stamped to provide two rectangular oblique openings in the horizontal support surface 15 and slots 29 for receiving the associated locking bolt 58. The dimension shown in FIG. 5A are in inches, as are all dimensions throughout the several drawings.

FIGS. 4A and 5B illustrate an alternate embodiment of the front member 14. In this embodiment, horizontal support surface includes two tabs, 61 and 62. Tabs 61 and 62 are crimped or notched as best shown in FIG. 4B at 63 and 64, respectively to facilitate fabrication. Details of the punchouts 29 and C are illustrated in FIGS. 5-1, 5-2 and 5-3.

Figure 6:
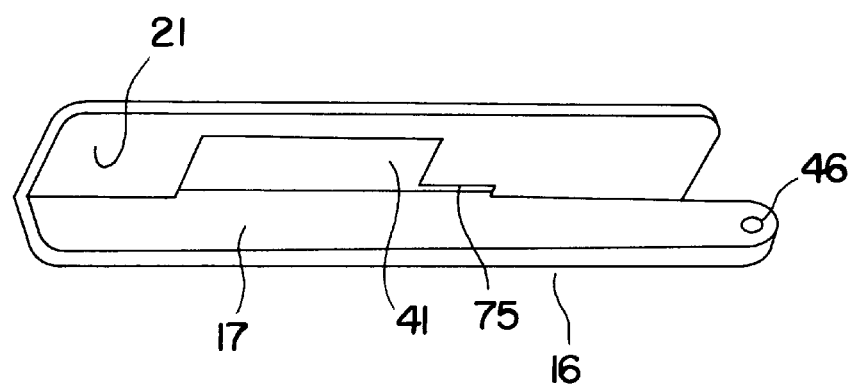
FIG. 6 is a perspective view of the right arm member of the invention shown in FIG. 3.
Figure 7:
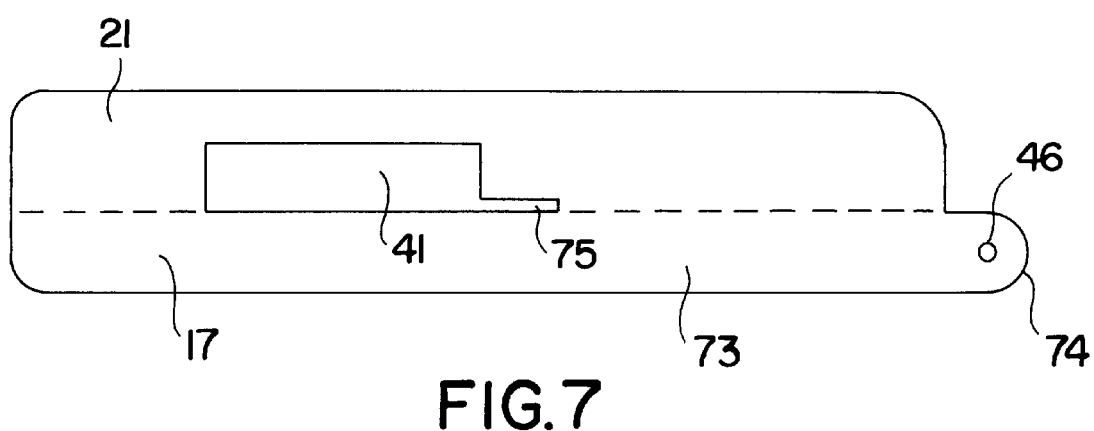
FIG. 7 shows an engineering blank of the right arm member shown in FIG. 6 showing physical dimensions of various parts.

FIGS. 6 and 7 illustrate the detail of right arm member 16 formed from flat blank 73 comprising support surface 17 and wall surface 21. Support surface 17 includes an extension 74 beyond the wall surface 21 which has a central opening 46 adjacent the end which enables the arm member to be pivoted to member 14. Wall surface 21 includes a central rectangular slot 41 with a further narrow slot 75 extending therefrom as shown in FIG. 3. When assembled, as shown in FIG. 3, the slot 41 is partitioned off by a strut 66 having a lip 67 which engages the upper edge of member 16. Strut 66 which is part of slide 38 thus confines arm 18 to the left most portion 40 of the slot as viewed in the drawing.

Figure 8:
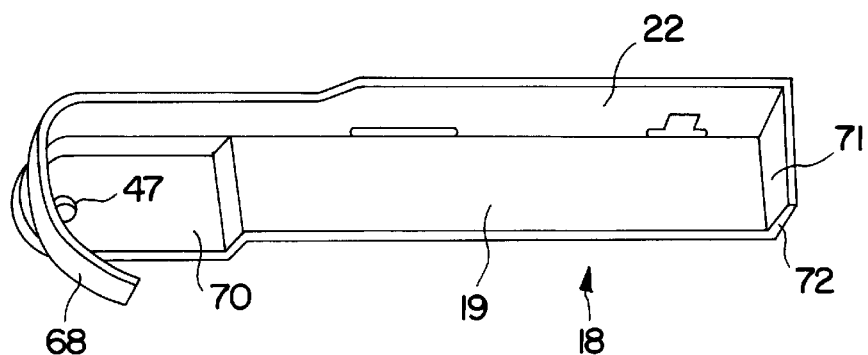
FIG. 8 is a perspective view of the left arm members of the invention shown in FIG. 3.
Figure 9:
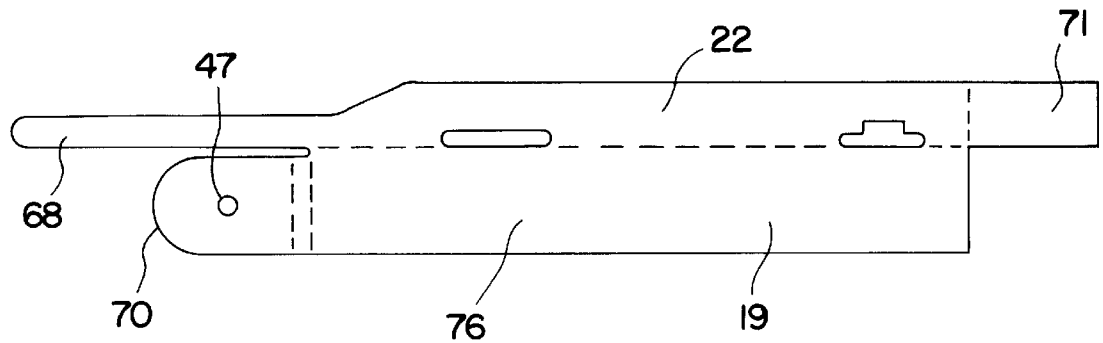
FIG. 9 is an engineering blank of the left arm member shown in FIG. 8 showing physical dimensions of various parts.

FIGS. 8 and 9 illustrate left arm member 18 formed from blank 76 to comprise a lower flat horizontal surface 19 and an upper wall surface 22. Upper wall surface 22 excludes a finger like extension 68 curved inwardly after wall 22 is folded upwardly to provide a guide for the pivoting member.

Flat surface 19 has an extension 70 which is pressed downward to be lower than surface 19 so that the extension 70 which pivots at 47 passes underneath the extension 48 of member 14 and thereby allows the lower surface 19 of member 18 to fold beneath member 14 in the collapsed position of the support. The opposite end of blank 19 includes an upper tab 71 which forms an upper end wall as shown in FIG. 8 which acts as a stop when member 18 is pivoted into its fold position with the edge 72 of the top abutting the outside wall surface of upper wall member 21.

Figure 10:
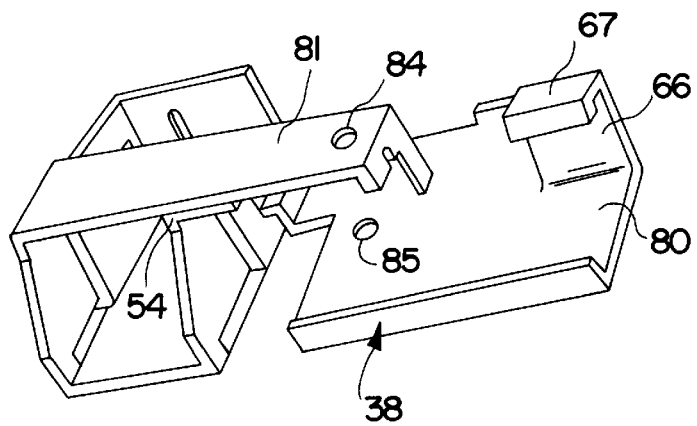
FIG. 10 is a perspective view of the slide shown in FIG. 3.
Figure 11:
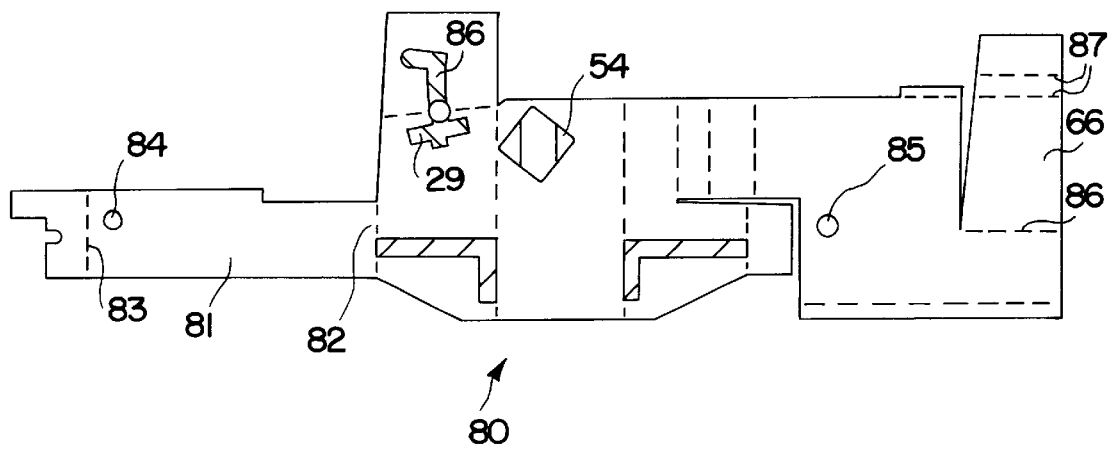
FIG. 11 is an engineering blank of the slide shown in FIG. 9 showing physical dimensions of various parts.

FIGS. 10 and 11 illustrate the details of the slide formed from a blank member 80. Blank 80 includes a finger 81 adapted to be folded at 82 and 83 such that opening 84 is co-axially aligned with opening 85 to enable locking bolt 43 to be passed therethrough. Opening 85 may either be threaded or the locking bolt 43 is adapted to engage a nut beneath the base surface of blank 80. Blank 80 includes several fold lines, shown as dash lines, to achieve the shape of the slide shown in FIG. 10. Fold lines 86 and 87 serve to help form the strut 66 and channel 67 which engages the upper edge of member 16 for locking the two arms in position. Opening 86 (similar to slots 29 hereinbefore described) allows the leg locking mechanism for leg 28 to be appropriately positioned so as to permit the leg to be rotated downward in its folded position in the channel 25 formed by walls 21 and 22.

Figure 12:
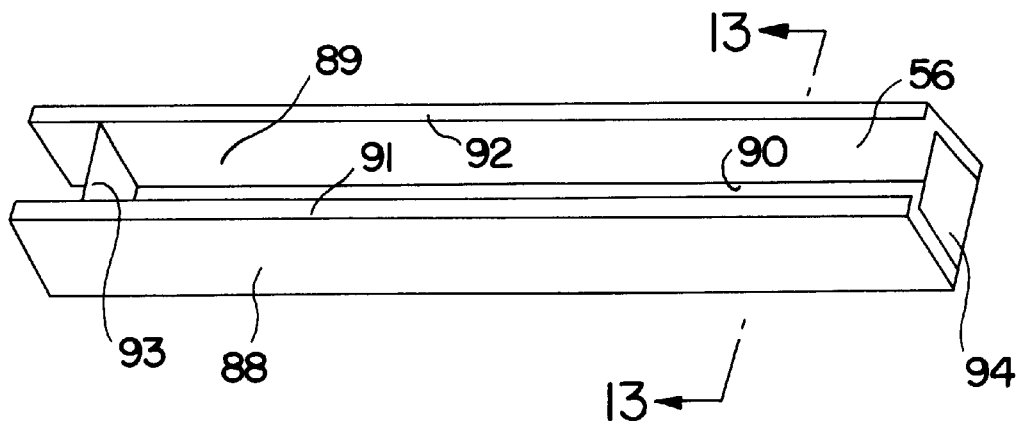
FIG. 12 is a perspective view of a leg of the inventive platform showing its inner channel, all legs being identical in shape.

FIG. 12 illustrates the construction of the supporting legs 28, 30, and 32, comprising each of which comprise sidewalls 88 and 89 and a central back connecting backwall 90 forming an access opening or slot 56 defining a central channel. Sidewalls 88 and 89 include lips 91 and 92 which restrict the opening 56 and enable nut 57 to be retained captively therein. The ends of the leg are closed off by end walls 93 and 94. End wall 93 is slightly less than the height of the other channel in the leg in order to enable a screw to be inserted past the end wall and captively retained within the channel.

Figure 13:
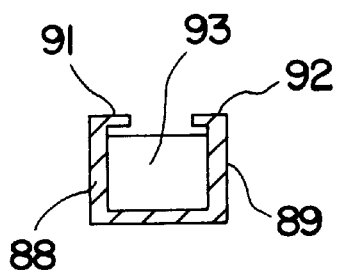
FIG. 13 is a cross section view of the leg of FIG. 12 taken along lines 13—13.
Figure 14:
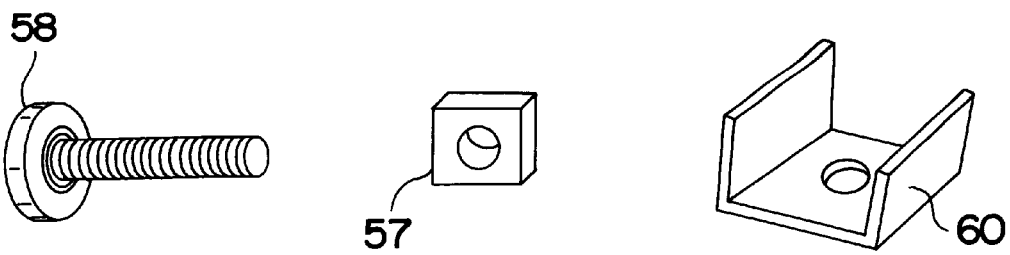
FIG. 14 is an expanded view of the leg locking mechanism of the invention.

FIG. 13 illustrates the leg channel in cross section taken along the lines of 13. While FIG. 14 illustrates the free members of the leg lock comprising bolt 58, C-shape channel member 60 and lock nut 57. Bolt 58 is passed through hole 59 in the channel member 60 to engage a lock nut captively held in a by channel.

While the preferred forms and embodiments of the invention have been illustrated and described, it will be apparent to those of ordinary skill in the art that various changes and modifications may be without deviating from the inventive concept and spirit of the invention as set forth above, and it is intended by the appended claims to define all such concepts which come within the full scope and true spirit of the invention.

What is claimed is:

1. A foldable platform comprising at least two members pivotally attached to ends of a first member and three legs, two of which are slidably attached to the first member and one of which is slidably attached to one of the other members, and having an open position and a fold down position, the volume of the platform in said positions being such that the platform has a compactability ratio of at least approximately 25 to 1 the fold down position including a nested configuration of the at least two members, the first member, and said three legs, the nested configuration taking the form of an elongate member.

2. A foldable platform comprising a first member, a second member and a third member, said first member having a pivot adjacent each of two opposing ends, said second and third members each having first and second ends, each said first end being pivotally attached to a respective opposing pivot of said first member, and means for attaching the second and third members at respective said second ends to form a triangular body.

3. The platform as set forth in claim 2 wherein said second member includes a slot and said third member is disposed to pass through said slot.

4. The platform as set forth in claim 3 further including legs supported at each corner of said triangular body and being independently adjustable to level the platform on an uneven surface.

5. A platform comprising:
   a first member, a second member, and a third member adapted to be operatively positioned to form a triangular supporting platform,
   said first member having a pivot adjacent opposite ends thereof, said second and third members each having first and second ends, each said first end being pivotally attached to a respective pivot on said opposite ends of said first member;
   said second member including a slide adjacent said second member second end for slidingly receiving said third member whereby said first, second and third members are arranged to be operably positioned between an open configuration for supporting objects and a collapsed, nested configuration wherein said second member abuts said first member and said third member abuts said second member along substantially mutually parallel longitudinal axes, and
   three legs, two of said three legs being pivotally slidably attached to said first member and one of said three legs being pivotally and slidably attached to the second member.

6. The platform as set forth in claim 5, wherein
   said first, second and third members when in nested configuration form a first and a second channel for storing said three legs.

7. The platform as set forth in claim 5, wherein each said leg is attached to a respective supporting member and is arranged to pivot relative to the attached said respective supporting member wherein each said leg is arranged to be operably positioned between a nested position and an erect position for locking engagement with the respective attached supporting member to establish level platform height.

8. The platform according to claim 7, wherein said legs are vertically adjustable.

9. The platform as set forth in claim 8, further comprising a respective attachment portion of each leg wherein each leg is arranged to be operably attached to the respective attachment portion so that a posture is obtained whereby the legs extend outward from the triangular supporting platform.

10. The platform as set forth in claim 7, wherein each leg is slidably received in an aperture in the respective supporting member for vertical orientation relative to the associated member.

11. The platform as set forth in claim 7, further including for each leg a respective nut and a bolt for threadingly receiving said bolt, each said respective nut and bolt cooperatively attaching a respective leg to an associated member, wherein each said leg comprises a channel for slidably retaining said respective nut in said channel, whereby operatively tightening said respective bolt draws said respective nut against an inner surface of the channel of an associated leg, thereby drawing said leg against said associated member.

12. The platform as set forth in claim 11, wherein each said channel is formed by a pair of side walls having inwardly turned lips extending along a longitudinal dimension of an associated side wall thereby forming a captive channel slidingly retaining said nut.

13. The platform as set forth in claim 7, wherein the volume of the platform in said open configuration and said nested configuration is such that the platform has a compactability ratio of at least approximately 25 to 1.

14. The platform according to claim 7, wherein the volume of the platform has a compactability ratio of at least approximately 25 to 1 between an open position and a closed position where the legs are in a nested configuration in the form of an elongate member.

15. A platform comprising a first member, a second member and a third member, said first member having a pivot adjacent each of opposing two ends, said second and third members each having first and second ends, each said first end being pivotally attached to a respective opposing pivot of said first member; and means for attaching the second and third members at respective said second ends to form a triangular body; said platform having an open position and a fold down position, the volume of the platform in said positions being such that the platform has a compactability ratio of at least approximately 25 to 1.

16. The platform as set forth in claim 15 wherein one of said two members includes a slot and the other of said two members being slidably engaged in the slot to arrange said members between an open article supporting position and a closed position wherein the members are nested against each other.

17. A platform as set forth in claim 15, wherein each leg is attached to a supporting member and is arranged to pivot relative to the attached member, wherein each said leg is arranged to be operably positioned between a nested position and an erect position for locking engagement with a respective attached member to establish level platform height.

18. The platform as set forth in claim 17, wherein said each leg is vertically adjustable.

19. The platform as set forth in claim 18, wherein said each leg is slidably received in an aperture in the attached respective supporting member for vertical orientation relative to the associated member.

20. The platform as set forth in claim 19, further comprising a respective attachment portion of each leg wherein each leg is arranged to be operably attached to the respective attachment portion so that a posture is obtained whereby the legs extend outward from the triangular supporting platform.

* * * * *